Oct. 13, 1936.  J. BIJUR  2,056,949
CENTRAL LUBRICATION
Filed Nov. 21, 1932  4 Sheets-Sheet 1
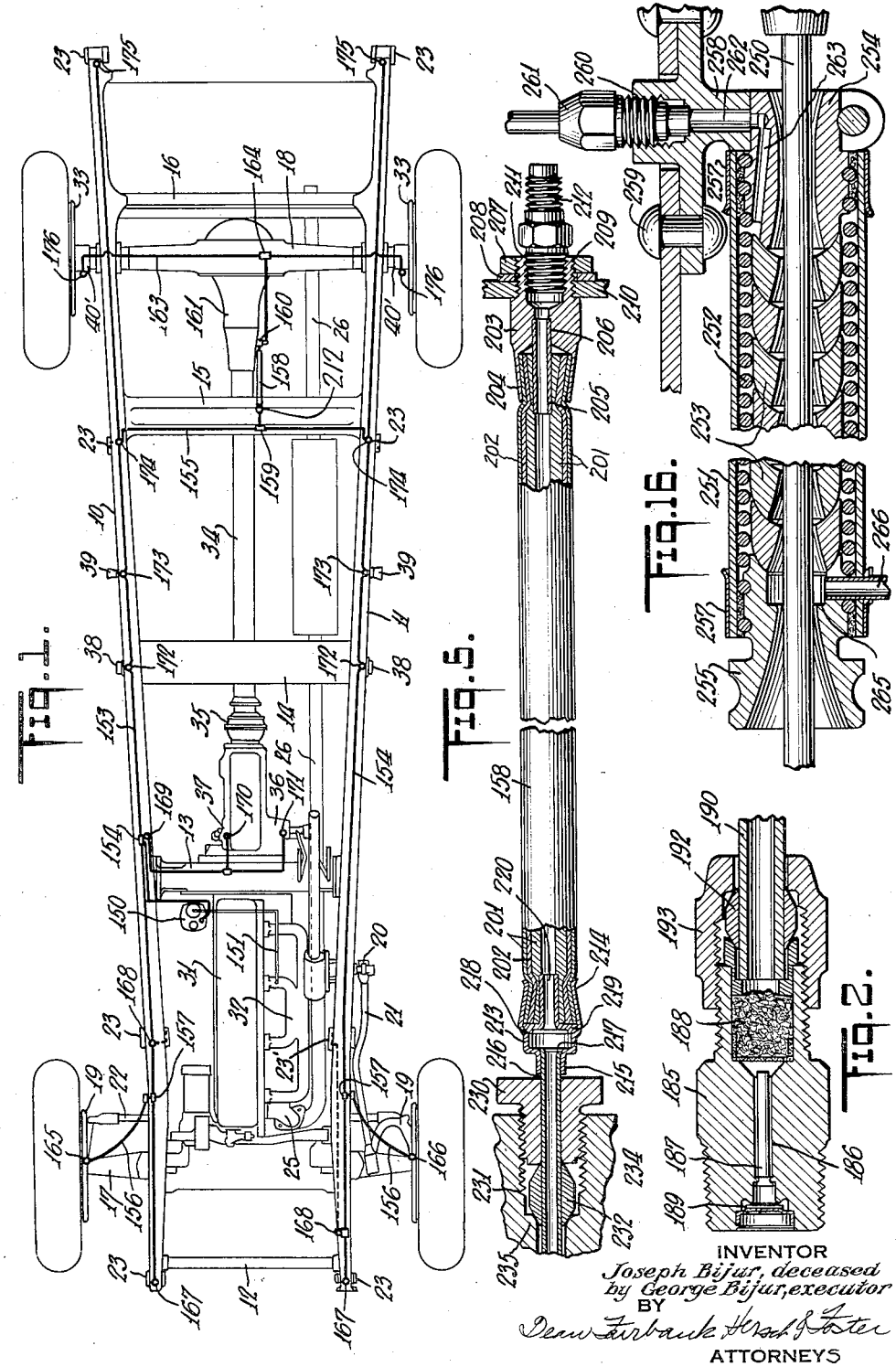
INVENTOR
Joseph Bijur, deceased
by George Bijur, executor
BY
Dean Fairbank Hersh & Foster
ATTORNEYS Oct. 13, 1936.  J. BIJUR  2,056,949
CENTRAL LUBRICATION
Filed Nov. 21, 1932  4 Sheets-Sheet 2
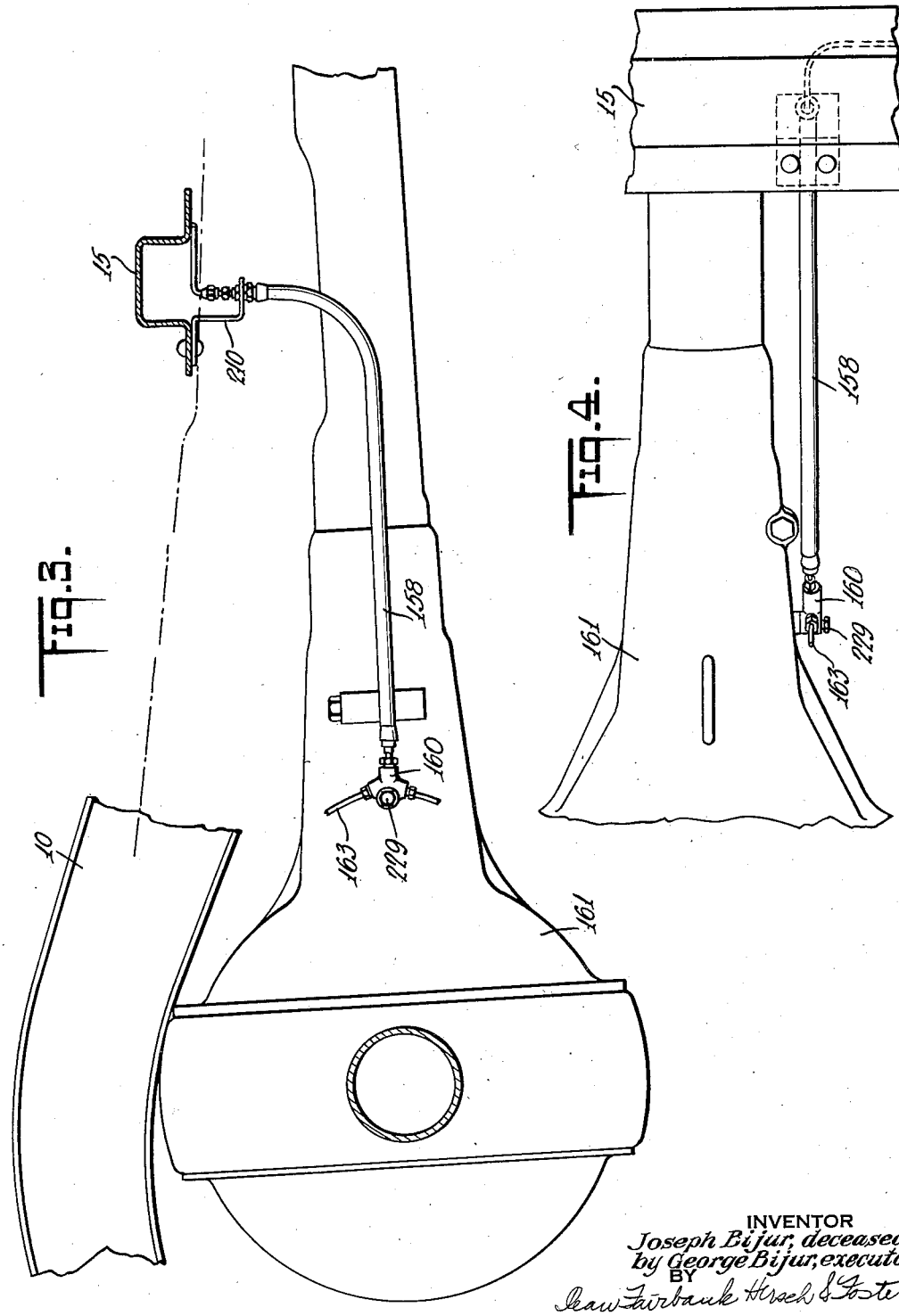
INVENTOR
Joseph Bijur, deceased
by George Bijur, executor
BY
ATTORNEYS Oct. 13, 1936.    J. BIJUR    2,056,949
CENTRAL LUBRICATION
Filed Nov. 21, 1932    4 Sheets-Sheet 3
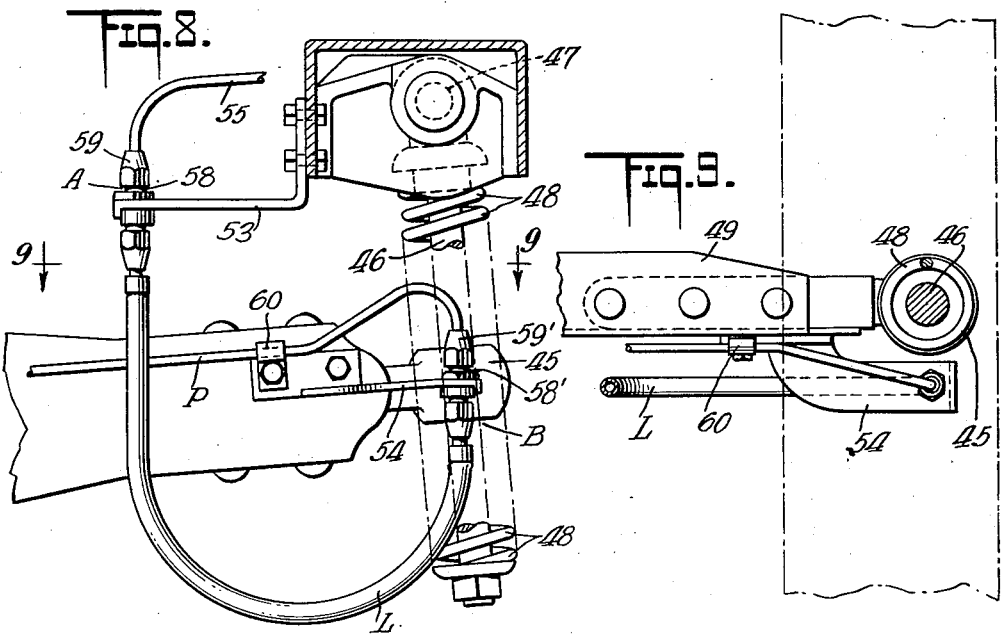
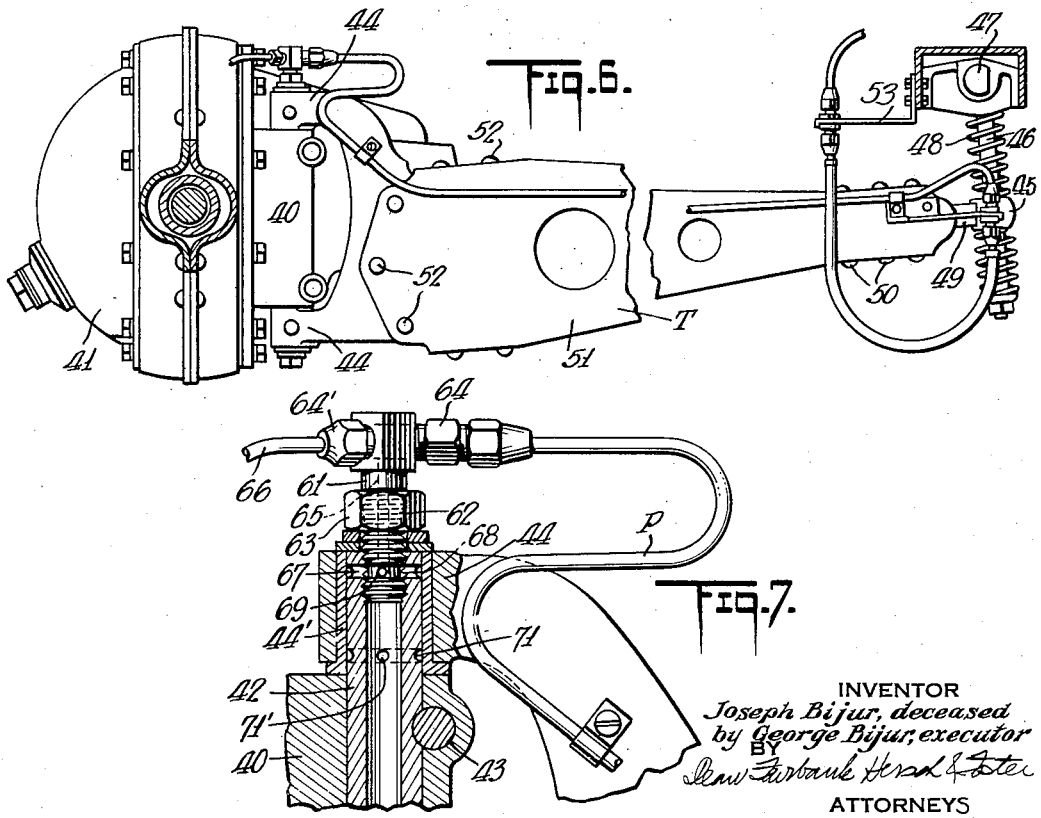
INVENTOR
Joseph Bijur, deceased
by George Bijur, executor
BY
ATTORNEYS

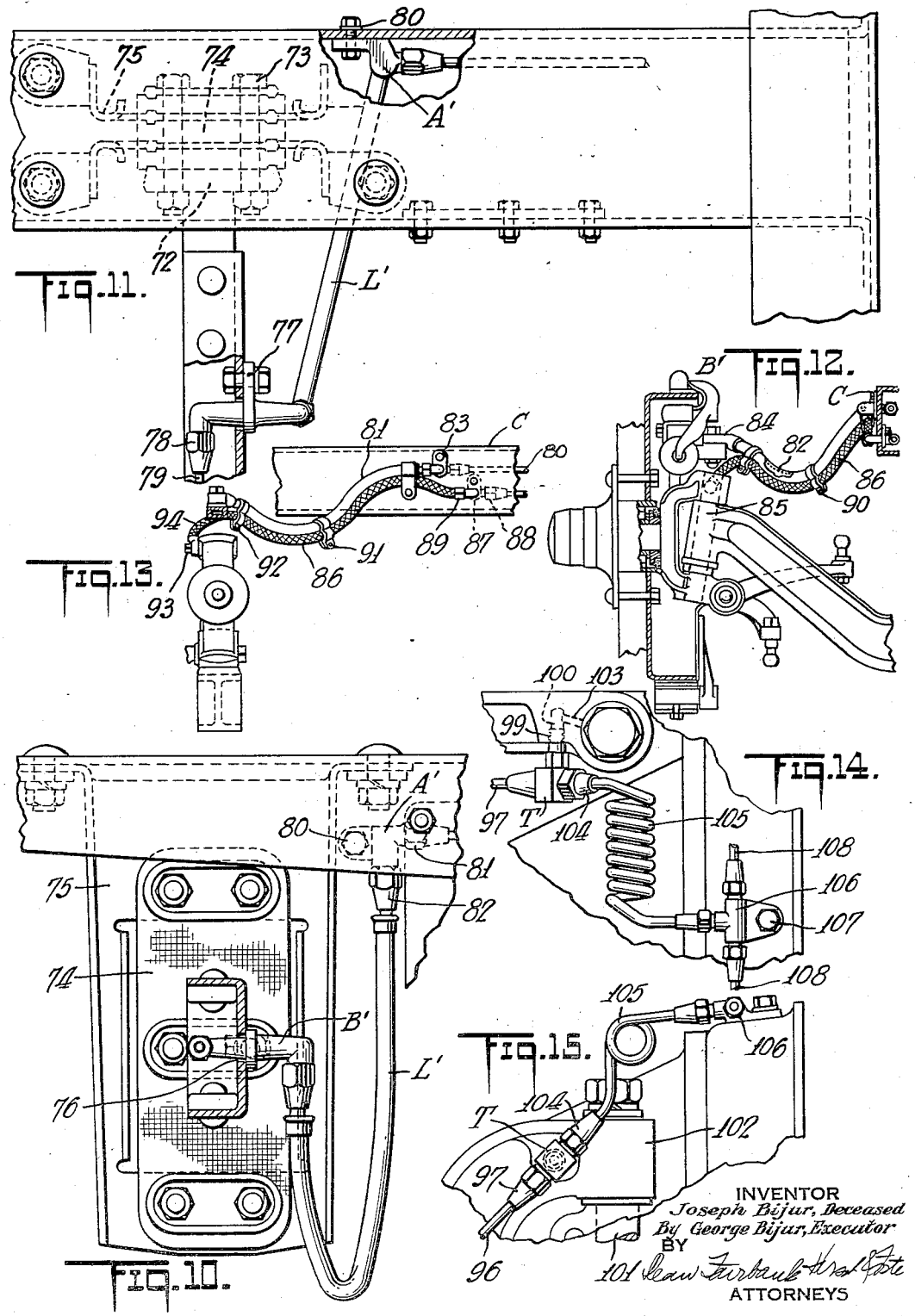

Patented Oct. 13, 1936

2,056,949

UNITED STATES PATENT OFFICE 2,056,949

CENTRAL LUBRICATION

Joseph Bijur, deceased, late of New York, N. Y., by George Bijur, executor, New York, N. Y., assignor to Auto Research Corporation, a corporation of Delaware Application November 21, 1932, Serial No. 643,640

23 Claims. (Cl. 184—7)

The present invention relates to lubrication, and is concerned particularly with central lubricating systems, adapted for automobile chassis and other mechanisms.

Although the present invention has broad application to central lubricating systems on machines generally, it has special advantageous application to continuous central chassis lubricating installations of the resistance proportioning or drip plug type. In these central chassis lubricating installations it is frequently desirable to supply or feed continuously the bearings of the chassis throughout the running period of the automobile at substantial pressures sufficient to overcome the differences in level at all times.

Continuous central lubricating systems of this type are usually quite sensitive to atmospheric temperature due to the tremendous change in lubricant viscosity with varying atmospheric temperature, decreasing temperature tending to increase the resistance encountered in the distributing lines. These systems are therefore provided with central pump units or sources of pressure which will generate a pressure at all times of sufficient magnitude to force the lubricant at the desired rate to and through the outlets so that much higher pressures are utilized in winter than in summer. However, difficulty is often experienced due to excessive feed particularly in summer when the lubricant is very fluid.

Moreover, this problem of changing viscosity with changing temperature is complicated due to the fact that the hot exhaust connections of the engine of the automobile vehicle will tend to heat the bearings on one side of the chassis and the drip plug outlets customarily applied thereat, to higher temperature than others. As a result there will be a non-uniform change of temperature at the outlets of the central lubricating system which will occur with varying atmospheric temperatures causing excessive flow of lubricant into the warmer bearings to the deprivation of the others.

Among the objects of the invention therefore are to provide a continuous central automobile chassis lubricating system, which will proportion lubricant satisfactorily among a plurality of bearings despite wide variations between winter and summer operation in the viscosity of the lubricant in the chassis lines, and which will accomplish this result without excessive feed even though some particular bearing or bearings be maintained at elevated temperatures varying far less widely than the temperature of other of the chassis bearings, as due to the proximity of the exhaust connections.

In accomplishing this object of the invention, satisfactory distribution of lubricant to the bearings may be maintained in spite of varying atmospheric temperatures and in spite of the heating influence of the engine and exhaust connections, by suitable arrangements of the conduit system and suitable control of the lubricant and ratings of the drip plug outlets.

It has been found most satisfactory to cause the pump or other pressure source to feed into the chassis installation at a place substantially removed from those bearings adjacent to the heated exhaust connections and to regulate the resistance of the drip plugs or flow proportioning devices, so that such resistance will be much higher than is customary in intermittent systems of the character disclosed in Patent No. 1,632,771.

In central chassis lubricating systems, as well as in other mechanisms having a plurality of parts movable relatively to one another, considerable difficulty has been encountered in providing flexible connections from the major element or principal structure of the mechanism, which carries the central pump and reservoir unit, to relatively moving parts of the mechanism which carry bearings to be lubricated. In an automobile these relatively moving parts are principally the axles, the drag link, the tie rod and so forth. In the case of an automobile vehicle, the major portion of the mechanism which carries the pump and reservoir unit is the framework of the chassis, said pump and reservoir unit being usually connected to or supported on the front of the dashboard of the automobile.

Although for many purposes the constructions of his Patents Nos. 1,845,826 and 1,845,827, have been found particularly satisfactory, for transmitting lubricant from the chassis frame itself to the front and rear axles and other movable parts or structures, nevertheless in many connections it has been found desirable to utilize flexible hoses, usually containing and in part composed of rubber materials.

In continuous central chassis lubricating systems, where the pressure ranges from about ½ lb. in summer, when the oil is very fluid, to 50 to 100 lbs. in winter, when the oil is very viscous and difficult to propel through the flow metering or drip plug outlets, it is desirable to utilize a flexible connection or hose which will not change the resiliency of the piping system to too great a degree and which will not tend to deteriorate excessively upon contact with lubricant and/or under the widely varying pressures to which it is subjected.

This hose at the same time should preferably have a bore of sufficiently small size as to generally prevent the reverse flow of air and oil through the lines, for reasons and in the manner more specifically pointed out in his Patents Nos. 1,632,771 and 1,732,212.

The hose must also stand up for long periods of time under the relatively high frequency vibratory action to which it may be subjected.

The hoses or similar connections which fulfill the various requirements above described, usually have the disadvantage of being very sensitive to torsional and longitudinal stresses, and it is among the objects of the present invention to provide a central lubricating system in which the flexible hoses are so arranged that they will not be subjected to torsional, whipping or longitudinal stresses either in attachment or in operation of the vehicle or mechanism.

As a result, such hoses or connections will stand up for longer periods of time in spite of the influence of the relatively high frequency reciprocating, bending or rolling movements to which they must necessarily be subjected.

In accomplishing the second object above mentioned, in one embodiment the flexible hose is unsupported between its ends and is permitted to droop to a greater or lesser degree, said droop being sufficient to assure that there will be no pulling or longitudinal stresses at its terminals throughout the maximum amplitude of the relative movement between the relatively moving elements. The hose is preferably connected so that its end portions will be in substantially parallel or right angular relationship and so that all reciprocatory movement will be taken up by a rolling or bending motion devoid of longitudinal pull or torsional twist and also devoid of whipping action in a portion of the hose substantially removed from the attachments of the ends of the hose.

It is desirable to arrange the ends of the hose in the entire hose structure so that the hose will hang or droop in a vertical plane, and so that the plane of the parallel or perpendicular ends of the hose will substantially coincide with the plane of the entire hose throughout its movement.

In constructing and operating hoses of this character it has been found important to fix the ends of the hose rigidly to the supporting structure and to avoid any swivel connections at the ends of the hose so that all stresses will be confined and limited to the intermediate or median portion of said hose.

In another embodiment, in which flexible brake connections are already provided from the chassis to the front axle it has been found most satisfactory to provide a symmetrical arrangement, in which hoses will extend from each side of the chassis frame at a point substantially to the rear of the axle over to the upper part of the knuckle structure. Preferably the knuckle ends of the hoses will be attached to the knuckle structure at or closely adjacent to the pivotal axis of the knuckle structure.

In the drawings, Fig. 1 shows in top view a diagrammatic layout of a chassis and a central lubricating installation attached thereto according to a preferred embodiment of the present invention.

Fig. 2 shows in longitudinal section one type of a flow controlling resistance outlet or drip plug which may be employed.

Figs. 3 and 4 show one type of hose connection which may be employed in bridging over from the rear end of the chassis frame to the casing for the propeller shaft or to the rear axle housing.

Fig. 5 shows on a larger scale and in fragmentary section the hose of Figs. 3 and 4.

Fig. 6 is a fragmentary side elevation indicating the arrangement of conduit lengthwise of the torque arm.

Fig. 7 is a fragmentary view partly in section on a larger scale, indicating the lubrication of the rear pivot of the torque arm.

Fig. 8 is a fragmentary side elevation of one application of my conduit arrangement for supplying lubricant to a torque arm.

Fig. 9 is a sectional view taken along the line 9—9 of Fig. 8.

Fig. 10 is a side elevation of an alternative embodiment.

Fig. 11 is a plan view of the embodiment shown in Fig. 10.

Fig. 12 is a rear view partly in section of an application to a steering knuckle.

Fig. 13 is a side view thereof.

Fig. 14 is a plan view of an embodiment alternative to that shown in Fig. 7.

Fig. 15 is a side elevation thereof, and

Fig. 16 is a fragmentary view in longitudinal section of an arrangement for feeding toward the front axle from another type of brake operating construction bridging from the chassis frame to the front axle.

In Fig. 1 the chassis frame is provided with side members 10 and 11 and with the cross members 12, 13, 14, 15 and 16. Supporting the chassis frame by the usual semi-elliptical springs (not shown) are the front axle 17 and the rear axle 18, the front axle being provided at each end with the steering knuckles 19 which are actuated from the steering gear 20 by the drag link 21 and the tie rod 22.

The spring connections between the front and rear axle 17 and 18 and the chassis frame 10—11 are provided with bearings in the chassis frame diagrammatically indicated at 23, said bearings either taking the form of hinges or shackles.

The engine 31 is supported upon the chassis frame and is provided with the intake manifold 32 above the exhaust manifold 25. The exhaust connection 26 extends along the side of the automobile as shown.

The presence of the exhaust connections at the left side of the automobile have a tendency to heat up the front end of the chassis side member 11 and the bearing 23 most closely adjacent thereto. As a result of such heating action the bearings on the left side of the car will have a temperature averaging 5 to 15° F. above those on the right side, and the closest shackle bearing 23' will often have a temperature as much as 15 to 25° F. higher than those on the right side.

The engine 31 is operatively connected to the driving wheels 33 on the rear axle by a propeller shaft enclosed in the casing 34 which has a covered universal joint at its front end 35. The brake and clutch pedal and the clutch release bearing structures are diagrammatically indicated at 36 and 37.

The pump and reservoir unit 150 may be of the type shown and described in his copending application Serial No. 468,790, filed July 18, 1930. As shown, the pump is provided with a fluid connection 151 to the intake manifold 32. The pump 150 feeds directly to the main 153 by the junction 154, and the main 153 feeds the other main 154 by means of the cross conduit 155 supported by the cross member 15 adjacent to the rear of the chassis frame. The circles connected to the various mains indicate the flow metering instrumentalities or drip plug outlets, while the various rectangles indicate the junction devices. As shown on this figure hoses 156 extend forwardly from junctions 157 on the mains 153 and 154, said junctions being located at the rear of the front axles.

The hose 158 supplying the rear axle extends rearwardly from the junction 159 on the transverse conduit 155 to the junction 160 carried on the housing 161. The hose 158 feeds the transverse conduit 163 on the rear axle by the junction 164. The line 163 supplies lubricant to the drip plugs 176 connected to the rear brake shaft bearings 40'.

The drip plugs 165 and 166 which are supplied by the flexible connections 156 feed the upper and lower pivotal or king pin bearings at the front axle steering knuckles, and the thrust bearing also associated with said front knuckle. By suitable piping arrangements the drag link and tie rod arm bearings may also be fed from said drip plugs 165 and 166.

The drip plugs 167 at the front end of the chassis frame feed the right front spring hinge and the left front spring anti-shimmy shackle, while the drip plugs 168 feed the rear front spring shackles.

The drip plugs 169, 170 and 171 feed the bearings of the hand brake hand lever idler bearing, the clutch release bearing and the clutch and brake pedal bearing respectively, reading from right to left. The drip plugs 172 feed the brake cross shaft bearings, the drip plugs 173 feed the brake lever, and the drip plugs 174 and 175 respectively feed the front and rear spring shackle bearings. As previously pointed out the shackle bearing 23' will be at a temperature of 15 to 20° higher and the other bearings in the left side of the chassis bearings will be at temperatures 5 to 15° higher than the corresponding bearings at the right side of the chassis bearing frame due to the proximity of the exhaust connection.

This increase in temperature will result in a decrease of viscosity or increase in fluidity of the lubricant of two times from the right to the left side of the chassis frame and of about four times at the shackle bearing 23'. To overcome this increase in fluidity and to prevent the drip plug bearings on the left side from feeding two to four times as rapidly as the drip plugs to the bearings on the right side, the pump 150 is directly connected to the junction 154 on the right side of the frame and/or the bearings on the relatively colder right side of the frame are positioned more closely adjacent to the junction 154 than are the bearings on the left side of the frame. As a result, any pressure drop occurring in the line from the junction 154 to the drip plug 174 on the left side of the frame at the end of the cross conduit 155 will assist in overcoming this non-uniform temperature effect and tend to equalize the proportioning on the different sides of the chassis frame.

If desired, in certain cases the cross conduit 155 may be provided with a restriction or be made of such small bore that there will be an increased pressure drop as between the right and left sides of the chassis. To adjust for the additional heating to which the bearing 23' is subjected, the drip plug 168 applied thereto is preferably positioned far in front of the exhaust connection so that the drip plug 168 will not be subjected to the relatively high temperature of the exhaust manifold and will have a temperature approximating that of the rest of the bearings on the left side of the chassis.

A typical flow metering outlet instrumentality or drip plug as connected at the end of the line is shown in Fig. 2. It consists of a body 185 having a central bore 186 substantially completely filled by a restriction pin 187, the clearance between the restriction pin 187 and the bore 186 determining the rating of the fitting. At the inlet of the fitting is provided the filter or strainer 188 and at the outlet a check valve 189. The pipe end 190 is connected to the end of the drip plug by the compression sleeve 192 and the nut 193.

When the drip plug is connected in the middle of the line a T head or other type of multiple head is provided. The operation of the drip plug system of this particular type and the detailed construction of the drip plugs is more fully described in his Patents Nos. 1,632,771 and 1,632,772, and in his application Serial No. 468,790, filed July 18, 1930.

The drip plugs are preferably of such a regulated resistance range that according to the requirements of the bearings they will permit a flow ranging from 0.16 c. c. per hour at 1 lb. pressure with an oil of 1500 Saybolt seconds viscosity and at 100° F. to a flow of 1.14 c. c. per hour under similar conditions. For example, the drip plug 167 applied at the right front spring hinge, and the drip plugs 169, 170, 171, 172, 173 and 176 will all have a flow rate of 0.16 c. c. per hour under the conditions above stated. The drip plugs 168 at the rear shackles of the front spring 174 at the front shackles of the rear springs, as well as the drip plug 167 at the front spring shackle will have a flow rate of about .32 c. c. per hour. It has been found usually desirable to give the drip plugs 175 at the rear spring shackles a higher rating and preferably they should have a flow rate of about 0.64 c. c. per hour. The drip plugs 165 and 166 at the outlet ends of the hoses 156 supply a relatively large number of bearings and are usually so rated as to give a flow of about 1.3 c. c. per hour.

The attachment of the hose 158 is more fully shown in Figs. 3, 4 and 5. A preferred hose construction as shown in Fig. 5 has inner and an outer lamination 201 of rubber and an intermediate lamination 202 preferably consisting of a plurality of layers of woven fabric. The inner layer of rubber is substantially impervious to oil and the presence of fabric 202 aids materially in reinforcing the hose and in preventing distention thereof under internal pressure.

The hose 158 at its inlet end is provided with a ferrule 203 having a skirt 204 which encircles the end of the hose. A metal tubular element 205 is preassembled as an element of the hose unit and its extremity affixed by passing through an axial bore in the ferrule at 206. The ferrule skirt 204 is now swaged inwardly as shown to clamp the hose against the inner end of the tube. The material of the hose end is sharply compressed due to the combined expanding action of the inserted pipe end 205 and the constriction action of the skirt 204. The nut 207 and the washer 208 are placed on the threaded end 209 of the ferrule 203 and serve to clamp the inlet end of the hose to the bracket 210.

The bracket 210 serves as a means of connection to the chassis structure and assures a connection which will be devoid of any twist of the hose incidental to said connection. The threaded end 209 of the ferrule 203 is provided with a tapped socket 211 which receives the threaded end of drip plug 212 which may be of the same construction as shown in Fig. 2. The drip plug 212 cooperates with the drip plugs 176 to assure satisfactory distribution of the lubricant to the bearings 40' and at the same time regulates the pressure upon the hose 158 and prevents excessive pressures being applied thereto. Moreover, if any break in the hose 158 takes place, the drip plug 212 will maintain a substantial pressure in the piping system and will assure some supply to the remaining bearings.

The outlet end of the hose is similarly provided wtih a ferrule 213 having a skirt portion 214 adapted to be slipped freely over the hose. The ferrule has an integrally reduced outlet sleeve 215 into which a metal tube extension 216 is sweated, the end of said tube being flared outwardly at 217 against the flared base of the sleeve 215. Seated against the shoulder 218 in the ferrule 213 is the disk 219. The disk 219 is formed with an integral tubular axial extension 220 against which the material of the hose is compressed as the skirt or cylinder 214 is swaged inwardly to compress the latter tightly. Hoses of this character are also described in his application Serial No. 396,304, filed September 30, 1929, which discloses a variant manner of attaching the hose to the front axle, the present application being a continuation in part of said application.

As has already been previously stated, the inlet end is preassembled with the bracket 210 to prevent any twisting of the hose upon application to the structure of the chassis, as shown in Figs. 3 and 4. The outer end of the hose of Fig. 5 (see also Figs. 3 and 4) is similarly connected to a junction 160, which is attached by means of a bolt 229 to the rear axle housing. The coupling nut 230, the socket 231 and the sleeve 232, are formed in such a manner that a substantial crimping action close to the axis will take place as the nut 230 is screwed into the socket 231 at the outer end of the sleeve, while the tapered portion 235 of the socket will closely contact with the inner end of the sleeve 232 and wedge it into position to prevent its turning. A similar construction to prevent turning of the pipe 190 is also shown in Fig. 2.

These coupling arrangements are more fully described in copending application Ser. No. 502,900, filed December 17, 1930.

In Figs. 3 and 4, it will be noted that the hose has been connected at its inlet end to the channel-shaped cross member 15 and at its outlet end to the housing 161 so that the ends of the terminals of the hose will be perpendicular to each other. At all times during the movement such relation will be substantially maintained and said hose regardless of the relative positions of the rear axle and chassis frame will be in a single vertical plane. In this construction substantially no stress will be applied to the ends of the hose and any vibratory reciprocating stress which may be applied to the hose will be at maximum at an intermediate portion of the hose and will gradually taper off in magnitude toward the terminals. It will be noted that the hose is altogether free of any torsional or longitudinal stresses, because of the anti-twist coupling and because there will always be a substantial loop in the hose, which loop will be at its maxium at the median relative position of the rear axle and chassis frame and at its minimum at the extreme positions.

In a familiar arrangement of torque arm, shown in Figs. 6 and 7, a special enlargement 40 in the differential housing 41 carries a vertical pivot pin 42 keyed as at 43 to the axle and mounting the clevis bearings 44 of the torque arm T. At the forward end, the torque arm has a ball structure 45 through which extends a pin 46 pivoted about a horizontal axle 47, the ball being yieldingly retained between corresponding ball cups (not shown) by coil compression springs 48 encircling the pin 46. The torque arm is preferably of composite construction, the ball being a part of a shank 49 riveted as at 50 to a channel frame structure 51, constituting the main length of the torque arm, the clevis end 44 being riveted as at 52 to the channel frame. The torque arm serves to resist the tendency of the axle to revolve by reaction due to the propulsion of the driving wheels. In this action of the torque arm, the mounting pin 46 will tend to pivot forward and backward about its support 47, while the ball 45 will have a tendency to reciprocate along pin 46 against the resistance of springs 48. In the movement of one of the driving wheels over an obstruction, for instance, the rear axle and with it the torque arm will tend to rock about the longitudinal axle of the vehicle and the clearance of ball 45 with respect to pin 46 permits this rocking. In such action, however, one of the rear springs may compress or rebound through a greater range at any instant than the other, causing the rear axle to change slightly from its position at right angles to the longitudinal axis of the vehicle and this action is accommodated by a slight pivoting of pin 42 within clevis jaws 44. The construction and arrangement of torque arm thus far described taken by itself is not his invention.

To convey lubricant from the frame to the torque arm, he has provided the arrangement illustratively shown in Figs. 8 and 9. For this purpose, an angle bracket 53 is mounted on the frame, to the horizontal arm of which is secured a terminal A of the type shown in Figs. 3 to 5 in position laterally of the torque arm and thereabove. To the forward end of the torque arm is bolted another bracket 54 extending forward therefrom, and at substantially the transverse plane of the ball mount 45 there is mounted another one of the terminals B of the type shown also in Figs. 3 to 5.

The two terminals are connected by a length L of the flexible conduit preferably of the type shown in Fig. 5, said conduit drooping as shown in Fig. 8, the two terminals being preferably in a vertical plane parallel to the longitudinal axis of the torque arm. The plane in which the bendable conduit L droops is parallel to the longitudinal axis of the torque arm. By this arrangement, it will be seen, that the conduit L is not subject to deleterious strain, for the movement of the terminal B along the pin 46 and with said pin about its mounting axis 47 in the operation of the vehicle, are both in substantially the plane of the loop L.

The conduit L being mounted by terminals of the type shown in Fig. 5, no appreciable torsional strain is applied to the conduit in the application there.

The inlet terminal A is supplied from the copper inlet pipe 55, the end (not shown) of which is attached thereto by nut 59 threaded over inlet nipple 58. The outlet fitting B on the torque arm has an outlet nipple 58' to which a copper pipe P is secured by nut 59', said pipe extending longitudinally of the torque arm and being clipped thereto for instance at 60, and extending rearward therealong to a dividing post 61 threaded as at 62 into a cap screw 63 (Fig. 7) in turn threaded into the hollow mounting pin 42. Post 61 is a drip plug construction, including a restriction pin and preferably also a relief valve, as shown in Fig. 2, and delivering to the bearings of pin 42 in manner described below.

The drip plug post 61 is supplied by an inlet fitting 64, threaded laterally thereinto and to which pipe P delivers. An outlet fitting 64' is connected to pipe 66, which leads to bearings on the rear axle, drip plugs being preferably provided near said bearings as shown in Fig. 1. The hollow pin 42 is provided with a radial bore 67, supplied through radial bore 69 in the cap screw 63 and communicating with an encircling groove 68 by which lubricant is supplied to bearing bushing 44'. An additional encircling oil collecting groove 71 about the pin 42 and at the lower end of bushing 44' intercepts oil and delivers it through bore 71' to the interior of hollow pin 42 to pass downward lengthwise, to lubricate the lower bearing (not shown) thereof in manner apparent from the present description. Preferably extra length in the form of an S loop P' is provided in the copper pipe P which accommodates the minute pivotal movement of the clevis 44 about the fixed pin 42, when one rear spring elongates more than the other.

In Figs. 10 and 11 is shown a modification embodying in lieu of the spring-pressed ball mount for the forward end of the torque arm, a fabric mount. The forward end of the torque arm has a flattened head 72 bolted as at 73 to rectangular pieces of fabric 74 extending in a vertical plane and clamped between a pair of jaws 75 at its upper end and between a similar pair of jaws at its lower end. It will be understood that in the operation of the vehicle, the yielding fabric mount will bow inward and outward to allow substantial forward and backward movement of the torque arm end, but will not permit up and down movement thereof. In order to clear the fabric joint, the flexible conduit L', which may be of the type of that shown in Fig. 5, leading from the frame to the torque arm, is shown extending in a plane forming a small angle relative to the axis of the torque arm.

The flexible conduit preferably has a substantial droop providing substantial extra length which can accommodate the forward and backward movement of the torque arm axially of the vehicle. In the preferred embodiment, the terminal A' is secured to the frame by bolt 80 extending through a corresponding lug, said terminal being an elbow fitting with an inlet 81 and an outlet 82 supplying conduit L'. The outlet terminal B' is a special forging extending through a corresponding aperture 76 in the channel member of the torque arm and is bolted thereto at an ear 77. The outlet 78 of the fitting B' is within the channel section and the conduit 79 leading therefrom to the rear of the torque arm and axle is, therefore, concealed and protected within the channel section.

Referring now to Figs. 12 and 13, he has shown a special application of a lubricant conduit of the type described, in association with a hydraulic brake system on an automotive vehicle. In a system of this type, hydraulic pressure is transmitted from a manually controlled source (not shown) to all of the brakes B' simultaneously through an appropriate piping system, a fragment of which is shown at 80, said system including a bridging portion which is flexible to accommodate the movements of the wheel relative to the frame, that is, to accommodate the spring compression and rebound as well as the steering movement of the wheel. The flexible member is a relatively heavy rubber hose 81 about ¾" in external diameter, maintained expanded by a spring 82 coiled at the inside thereof and has sufficient stiffness to avoid whipping or lashing in use of the vehicle. The terminals of the rubber hose are fittings clamped at one end to the frame as at 83 and at the brake end at 84, and preferably directly above the king pin 85.

According to the present embodiment of his invention, he passes lubricant from the frame to the knuckle through a conduit 86, preferably of the type shown in Fig. 5, which conduit is attached to the rubber hose 81 of the hydraulic brake system. In the preferred embodiment, as shown in Fig. 13, there is a fitting 87 extending through the channel C of the chassis frame, near the end 83 of the rubber hose 81 and of generally S-shape, at the inner end of which is mounted a restriction fitting 88 of the type shown in Fig. 2.

Preferably the conduit 86 has a terminal 89 of the type shown in Fig. 5 and mounted at the exposed part of fitting 87 on the frame. A plurality of appropriate fasteners 90 are mounted at intervals along the length of the rubber hose 81 and serve to maintain the length of the lubricant conduit 86 in engagement therewith. These fasteners are preferably clips curved to embrace the two conduits and drawn together each by a bolt 91. The clip 92 farthest from the frame is preferably at the very extremity of the rubber conduit 81, so that said clip is substantially rigid with the knuckle. The lubricant conduit 86 extends beyond said clip, preferably to the upper bearing of the king pin 85, where it is attached preferably by another one of the terminals 93 of the type shown in Fig. 5. The conduit length 94 between clips 92 and the terminal 93 need not droop or provide extra length, since the clip 92 moves as a rigid unit with the knuckle, that is, there is no relative movement between the clip 92 and the terminal 93.

The conduit 81 is of construction sufficiently heavy not to whip or lash in the movement of the vehicle and the frailer conduit 86 being clipped thereto, will thus be amply supported against whipping or lashing, said conduit flexing, however, with the rubber conduit to accommodate the various displacements of the knuckle relative to the frame. In the construction shown, it will be seen that the conduit 86 extends substantially horizontally in a single vertical plane slightly inclined with respect to the length of the vehicle, so that the movements of the knuckle including that of steering, will exert no substantial torsion upon said conduit, all of said movements occurring substantially in the plane of said conduit.

While he has shown his lubricant conduit extending along the flexible conduit from the hydraulic brake of a steering wheel, it is understood that in a vehicle equipped with hydraulic brakes of the type referred to, the rear or nonsteering wheels also might be provided with lubricant by a conduit supported upon the rubber hose bridging to said latter wheels in manner similar to that shown in the drawings.

In Figs. 14 and 15 is shown an arrangement alternative to that shown in Fig. 5 for delivering lubricant from the torque arm to the back axle. The conduit 96 along the torque arm is coupled at 97 to one arm of a T drip plug, the stem of which is threaded as at 99 into a socket 100 in the torque arm adjacent the pin 101 that mounts the torque arm clevis 102. The socket 100 communicates through a bore 103 in the torque arm with the bearing of pin 101, said pin lubricated in manner similar to the arrangement shown in Fig. 7. The other arm of the T drip plug carries the terminal 104 of a bridging length of pipe, conformed into a helix 105, the axis of which preferably extends horizontally in the plane of the pin 101 and thereabove, and delivers to a T fitting 106 bolted to the rear axle as at 107, from which the lubricant is passed on to the brakes or associated mechanism through pipes 108 longitudinally of said rear axle. While the bridging length 105 may be of brass or similar elastic material, it is sufficient for the present purpose, by reason of the extremely small range of rotary movement, which need be accommodated in use, to employ a helix or bridging length of copper or similar soft metal. In order to assure correct division of the lubricant from pipe 96 between the torque arm bearings and the bearings supplied from the bridging run 105, it is preferred to provide an appropriate flow controlling restriction of the type heretofore referred to, in the mounting stem 99 of the T fitting, and similar restrictions preferably in the fittings through which the lubricant is passed from the pipe sections 108.

In Fig. 16 is shown an alternative hose connection leading to the front axle and in housing a brake operated construction particularly adapted for cable brakes. The cable 250 is provided with suitable connections, not shown, and extends through a flexible tube having an external cover 251, an internal spring 252 and a plurality of cup and socket elements 253 which fit into each other and at the same time bear upon each other. At each end of the tube is provided an insert, 254 and 255, which are provided with flared openings and to these inserts are tightly clamped the ends of the tube 251 and the ends of the spring 252 by means of the rings 257.

The inlet end of the tubular member 251 is provided with a clamp 258 attached to the chassis structure at 259. The clamp carries a socket 260 which is provided with the drip plug 261, which may be of the specific type shown in application Serial No. 155,810, filed December 20, 1926. The lubricant from the drip plug 261 flows through the bore 262 into the bore 263 and then downwardly through the enclosure 251. At the outlet end of the hose a channel 265 is provided which collects the lubricant and permits the flow to a suitable place of disposal through the outlet pipe 266.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

What is claimed is:

1. A central chassis lubricating installation for an automobile vehicle having an engine with exhaust connections along one side of the chassis frame, whereby one side of said chassis frame is heated to a substantially higher temperature than the other side, said chassis frame including parallel side channel members and a plurality of transverse channel members, said frame being supported from front and rear axles carrying knuckle and brake bearings by longitudinal semi-elliptical springs, one at each end of each channel member, having hinge and shackle bearings on the side channel members, said frame also carrying a plurality of other chassis bearings, said installation including a pump actuated continuously throughout operation of the vehicle to feed relatively minute quantities of lubricant continuously in metered quantities to the chassis bearings, according to their needs, said pump adjacent the engine, piping mains along each side channel member with drip plug outlets to the bearings, a connection from said pump to the main on the cold side of the chassis and a transverse conduit from the main on the cold side of the chassis to the main on the warm side of the chassis substantially at the rear of the chassis.

2. A central chassis lubricating installation for an automobile vehicle having an engine with exhaust connections along one side of the chassis frame, whereby one side of said chassis frame is heated to a substantially higher temperature than the other side, said chassis frame including parallel side channel members and a plurality of transverse channel members, said frame being supported from front and rear axles carrying knuckle and brake bearings by longitudinal semi-elliptical springs, one at each end of each channel member, having hinge and shackle bearings on the side channel members, said frame also carrying a plurality of other chassis bearings, said installation including a pump actuated continuously throughout operation of the vehicle to feed relatively minute quantities of lubricant continuously in metered quantities to the chassis bearings, according to their needs, said pump adjacent the engine, piping mains along each side channel member with drip plug outlets to the bearings, a connection from said pump to the main on the cold side of the chassis and a transverse conduit from the main on the cold side of the chassis to the main on the warm side of the chassis substantially at the rear of the chassis, said knuckle bearings being positioned at each end of said front axle and being supplied by flexible rubber hoses extending from the side channel members to the knuckle structures, initiating at a point on the outside of the chassis frame substantially to the rear of the axle and terminating substantially at the pivotal axis of the knuckle.

3. A central chassis lubricating installation for an automobile vehicle having an engine with exhaust connections along one side of the chassis frame, whereby one side of said chassis frame is heated to a substantially higher temperature than the other side, said chassis frame including parallel side channel members and a plurality of transverse channel members, said frame being supported from front and rear axles carrying knuckle and brake bearings by longitudinal semi-elliptical springs, one at each end of each channel member, having hinge and shackle bearings on the side channel members, said frame also carrying a plurality of other chassis bearings, said installation including a pump actuated continuously throughout operation of the vehicle to feed relatively minute quantities of lubricant continuously in metered quantities to the chassis bearings, according to their needs, said pump adjacent the engine, piping mains along each side channel member with drip plug outlets to the bearings, a connection from said pump to the main on the cold side of the chassis and a transverse conduit from the main on the cold side of the chassis to the main on the warm side of the chassis substantially at the rear of the chassis, said rear axle bearings being lubricated by a transverse main carried on the rear axle, which is in turn fed by a hose connection from said transverse conduit.

4. A central chassis lubricating installation for an automobile vehicle having an engine with exhaust connections along one side of the chassis frame, whereby one side of said chassis frame is heated to a substantially higher temperature than the other side, said chassis frame including parallel side channel members and a plurality of transverse channel members, said frame being supported from front and rear axles carrying knuckle and brake bearings by longitudinal semi-elliptical springs, one at each end of each channel member, having hinge and shackle bearings on the side channel members, said frame also carrying a plurality of other chassis bearings, said installation including a pump actuated continuously throughout operation of the vehicle to feed relatively minute quantities of lubricant continuously in metered quantities to the chassis bearings, according to their needs, said pump adjacent the engine, piping mains along each side channel member with drip plug outlets to the bearings, a connection from said pump to the main on the cold side of the chassis and a transverse conduit from the main on the cold side of the chassis to the main on the warm side of the chassis substantially at the rear of the chassis, the bearing closest to the engine on the exhaust side being fed by a drip plug positioned at the front of the engine and connected thereto by a tail pipe.

5. In a motor vehicle, of the type comprising a frame, and a torque arm yieldingly connected to said frame at its forward end; the combination therewith of a central chassis lubricating installation including a central pump and reservoir unit, a branched piping system with flow metering outlets and means for conveying lubricant from the frame to the torque arm, said means comprising a rubber hose conduit bridging from the frame to the torque arm and near the forward end thereof, extending in a plane generally lengthwise of the torque arm, said conduit of the type subject to injury under appreciable twisting strain and of extra length sufficient to prevent longitudinal strains being incurred in use of the vehicle, the terminals of said bendable conduit being constructed and arranged to prevent the possibility of substantial twist on the conduit in the process of applying and securing the same.

6. In a motor vehicle of the type comprising a torque arm having a yielding mount with respect thereto at its forward end and at its rear end, a pivot mount with respect to the rear axle; the combination therewith of a central chassis lubricating installation including a central pump and reservoir unit, a branched piping system with flow metering outlets and means for conveying lubricant from the frame to the torque arm, said means including terminals at the frame and at the torque arm, a flexible rubber hose conduit of a type subject to injury under substantial twisting strains bridging between said terminals and extending generally lengthwise of the torque arm, said flexible conduit drooping from said terminals, said terminals being constructed and arranged to prevent the application of torsional strain on the conduit in the application thereof.

7. In a motor vehicle of the type comprising a frame, a rear axle, a torque arm connecting said elements and having a yielding mount at its forward end; the combination therewith of a central chassis lubricating installation including a central pump and reservoir unit, a branched piping system with flow metering outlets and a bendable rubber hose conduit for conveying lubricant from said frame to said torque arm, said conduit of the type resisting but small twisting strain per unit length, terminals for said conduit on the frame and on the torque arm respectively, said conduit drooping and extending in a plane inclined with respect to the longitudinal axis of the torque arm to clear the mount of the latter and having sufficient length to eliminate longitudinal strain which may be encountered in the forward and backward movement of the torque arm in operation.

8. In combination with a vehicle having a frame, a rear axle, and a torque arm connecting said elements; a central chassis lubricating installation including a central pump and reservoir unit, a branched piping system with flow metering outlets and means for conveying lubricant from the frame to the torque arm, said means comprising a bendable rubber hose conduit bridging from said frame to said torque arm, said conduit including a loop in a vertical plane parallel to the longitudinal axis of the torque arm, whereby in the forward and backward movement of the latter, torsional strain in the conduit is substantially avoided.

9. In combination with a vehicle having a frame, a torque arm having a yielding mount with respect thereto at the forward end thereof and having a pivot mount at the rear axle; a central chassis lubricating installation including a central pump and reservoir unit, a branched piping system with flow metering outlets and a bracket near the forward end of the torque arm extending laterally therefrom into substantially the vertical transverse plane of the forward pivot mount thereof, a conduit terminal mounted on said bracket, a bracket on the frame, a terminal mounted on said latter bracket, said terminals being in a common vertical plane parallel to the longitudinal plane of said torque arm and a rubber hose conduit connected between said terminals and drooping therebetween, whereby in the composite hinging and forward and backward movement of the torque arm in operation, the conduit will deflect in the plane thereof without substantial torsional strain thereon.

10. In a motor vehicle, of the type comprising, a frame, a rear axle, a torque arm connected to said elements, said arm including a channel bar, a clevis riveted thereto and having a hinge mount at the rear axle, a shank riveted near the forward end thereof and having a yielding mount with respect to the frame; the combination therewith of a central chassis lubricating installation including a central pump and reservoir unit, a branched piping system with flow metering outlets and means for conveying lubricant to and along said torque arm, said means comprising a fitting extending through the channel bar near the forward end thereof, a flexible conduit from the frame leading to said fitting and a conduit extending from said fitting lengthwise within said channel bar to supply the bearings associated with the rear axle.

11. In a motor vehicle, an axle, a torque arm having a rear end clevis straddling a part of said axle, a pivot pin therefor rigid with said axle and constituting a bearing for the clevis jaws to permit the small hinging movement incurred in operation; the combination therewith of a central chassis lubricating installation including a central pump and reservoir unit, a branched piping system with flow metering outlets and a lubricant outlet connected to the upper end of said pin, a conduit lengthwise of the torque arm for conveying lubricant to said outlet, said conduit having extra length near said outlet to accommodate the limited relative hinging movement between the fixed pin and the torque arm.

12. In a motor vehicle, in combination, a frame, a knuckle, a hydraulic brake system including a rubber tube bridging freely from the frame to the knuckle and rigidly attached at its ends to said members, a central chassis lubricating installation including a central pump and reservoir unit, a branched piping system with flow metering outlets and a flexible rubber hose bridging from the frame to the knuckle, said hose extending along the length of said tube and secured thereto at intervals, to move therewith substantially as a unit.

13. In a motor vehicle, in combination, a frame, a knuckle, a hydraulic brake system including a rubber tube bridging from the frame to the knuckle and rigidly attached at its ends to said members, a central chassis lubricating installation including a central pump reservoir unit, a branched piping system with flow metering outlets and a bendable rubber hose conduit bridging from said frame to said knuckle and extending lengthwise along said rubber tube and clipped thereto at intervals to move therewith substantially as a unit and further secured at the end of said rubber tube nearest said knuckle, said lubricant tube extending beyond said end to deliver to the knuckle.

14. In a motor vehicle, in combination, a frame, a knuckle, a king pin mounting the same, a hydraulic brake system including a rubber tube bridging from the frame to the knuckle, rigidly attached at its ends to said members and extending substantially in the plane in which the major portions of the relative movements between the frame and the knuckle occur, a central chassis lubricating installation including a central pump and reservoir unit, a branched piping system with flow metering outlets and a bendable rubber hose conduit bridging from said frame to said knuckle, and extending lengthwise along said rubber tube and clipped thereto at intervals to move therewith substantially as a unit, and further secured at the end of said rubber tube nearest said knuckle, said conduit extending directly beyond said end substantially along the knuckle to deliver at the king pin bearing.

15. In a motor vehicle, of the type comprising a frame, and a longitudinal member yieldingly connected to said frame, the combination therewith of a central chassis lubricating installation including a central pump and reservoir unit, a branched piping system with flow metering outlets and means for conveying lubricant from the frame to the member, said means comprising a rubber hose conduit bridging from the frame to the member and near the end thereof, extending in a plane generally perpendicular to the horizontal plane of the frame, said conduit of the type subject to injury under appreciable twisting strain and of extra length sufficient to prevent longitudinal strains being incurred in use of the vehicle, the terminals of said bendable conduit being constructed and arranged to prevent the possibility of substantial twist on the conduit in the process of applying and securing the same.

16. In combination with a mechanism having a main structure and a subsidiary structure connected to said main structure and movable in respect thereto, said subsidiary structure including an elongated element adapted to swing in a plane fixed relatively in respect to said main structure, said subsidiary structure carrying bearing means to be lubricated; a lubricating installation comprising a lubricant source on the main structure with an outlet element closely adjacent said subsidiary structure, a conduit system on said subsidiary structure with an inlet element positioned adjacent said outlet element, said system being connected to feed said bearing means, and a flexible rubber hose conduit extending in a loop from said inlet element to said outlet element with metallic tubular end portions fixedly and rigidly connected respectively to said inlet and outlet elements, said hose taking up relative movement between the main structure and said subsidiary structure, and always laying in a plane closely adjacent and substantially parallel to the plane of swing of said subsidiary structure.

17. In a motor vehicle of the type having a chassis frame structure part and a wheel structure part carrying a brake, said wheel structure part relatively movable in respect to said chassis frame structure part, said brake being actuated from said frame by an arrangement including a tubular sustaining member extending from the frame to the brake; a lubricant installation for bearings carried on the wheel including a source of lubricant carried on the chassis and means for conveying lubricant between said two relatively moving structure parts, comprising a bendable conduit to be sustained by said sustaining member, said sustaining member for said bendable conduit bridging freely between said structure parts and being flexible to accommodate the relative movements, and of stiffness greater than that of said conduit and sufficient to avoid whipping, and means securing said bendable conduit to said sustaining member at an intermediate point.

18. In a motor vehicle of the type having a chassis frame structure part and a wheel structure part carrying a brake, said wheel structure part relatively movable in respect to said chassis frame structure part, said brake being actuated from said frame by an arrangement including a tubular sustaining member extending from the frame to the brake; a lubricant installation for bearings carried on the wheel including a source of lubricant carried on the chassis and means for conveying lubricant between said two relatively moving structure parts comprising a bendable conduit to be sustained by said sustaining member, said tubular sustaining member for said bendable conduit bridging freely between said structure parts and having sufficient flexibility to readily accommodate the relative movements and of stiffness greater than that of said conduits and sufficient to avoid whipping, and a plurality of clips at intervals along the length of said tubular member and gripping said conduit to maintain the latter in close proximity to said tube lengthwise thereof for flexure as a unit therewith.

19. In combination with a mechanism having a main structure and a subsidiary structure connected to said main structure and movable in respect thereto, said subsidiary structure including an elongated element adapted to swing in a plane fixed relatively in respect to said main structure, said subsidiary structure carrying bearing means to be lubricated; a lubricating installation comprising a lubricant source on the main structure with an outlet element closely adjacent said subsidiary structure, a conduit system on said subsidiary structure with an inlet element positioned adjacent said outlet element, said system being connected to feed said bearing means, and a flexible rubber hose conduit extending in a loop from said inlet element to said outlet element with metallic tubular end portions fixedly and rigidly connected respectively to said inlet and outlet elements, said hose taking up relative movement between the main structure and said subsidiary structure, and always laying in a plane closely adjacent and substantially parallel to the plane of swing of said subsidiary structure, said metallic tubular end portion of the hose at the inlet end thereof being provided with a threaded socket receiving a drip plug to which said outlet element may be connected.

20. In combination with a mechanism having a main structure and a subsidiary structure connected to said main structure and movable in respect thereto, said subsidiary structure including an elongated element adapted to swing in a plane fixed relatively in respect to said main structure, said subsidiary structure carrying bearing means to be lubricated; a lubricating installation comprising a lubricant source on the main structure with an outlet element closely adjacent said subsidiary structure, a conduit system on said subsidiary structure with an inlet element positioned adjacent said outlet element, said system being connected to feed said bearing means, and a flexible rubber hose conduit extending in a loop from said inlet element to said outlet element with metallic tubular end portions fixedly and rigidly connected respectively to said inlet and outlet elements, said hose taking up relative movement between the main structure and said subsidiary structure, and always laying in a plane closely adjacent and substantially parallel to the plane of swing of said subsidiary structure, one end portion of the hose conduit being fixedly connected to a bracket to be attached to said main structure and the other end portion of the hose conduit being connected to said inlet element by a compression coupling assuring that the hose conduit will not be twisted upon such compression coupling.

21. In combination with a mechanism having a main structure and a subsidiary structure connected to said main structure and movable in respect thereto, said subsidiary structure including an elongated element adapted to swing in a plane fixed relatively in respect to said main structure, said subsidiary structure carrying bearing means to be lubricated; a lubricating installation comprising a lubricant source on the main structure with an outlet element closely adjacent said subsidiary structure, a conduit system on said subsidiary structure with an inlet element positioned adjacent said outlet element, said system being connected to feed said bearing means, and a flexible rubber hose conduit extending in a loop from said inlet element to said outlet element with metallic tubular end portions fixedly and rigidly connected respectively to said inlet and outlet elements, said hose taking up relative movement between the main structure and said subsidiary structure, and always laying in a plane closely adjacent and substantially parallel to the plane of swing of said subsidiary structure, the hose depending in the form of a U with one leg shorter than the other leg and said end portions being located in parallelism and in substantially the same plane throughout relative movement.

22. In combination with a mechanism having a main structure and a subsidiary structure connected to said main structure and movable in respect thereto, said subsidiary structure including an elongated element adapted to swing in a plane fixed relatively in respect to said main structure, said subsidiary structure carrying bearing means to be lubricated; a lubricating installation comprising a lubricant source on the main structure with an outlet element closely adjacent said subsidiary structure, a conduit system on said subsidiary structure with an inlet element positioned adjacent said outlet element, said system being connected to feed said bearing means, and a flexible rubber hose conduit extending in a loop from said inlet element to said outlet element with metallic tubular end portions fixedly and rigidly connected respectively to said inlet and outlet elements, said hose taking up relative movement between the main structure and said subsidiary structure, and always laying in a plane closely adjacent and substantially parallel to the plane of swing of said subsidiary structure, the hose depending in the form of a U with said end portions extending substantially in the same direction and lying in substantially the same plane throughout relative movement.

23. In combination with a mechanism having a main structure and a subsidiary structure connected to said main structure and movable in respect thereto, said subsidiary structure including an elongated element adapted to swing in a plane fixed relatively in respect to said main structure, said subsidiary structure carrying bearing means to be lubricated; a lubricating installation comprising a lubricant source on the main structure with an outlet element closely adjacent said subsidiary structure, a conduit system on said subsidiary structure with an inlet element positioned adjacent said outlet element, said system being connected to feed said bearing means, and a flexible rubber hose conduit extending in a loop from said inlet element to said outlet element with metallic tubular end portions fixedly and rigidly connected respectively to said inlet and outlet elements, said hose taking up relative movement between the main structure and said subsidiary structure, and always laying in a plane closely adjacent and substantially parallel to the plane of swing of said subsidiary structure, said end portions being connected to said inlet and outlet elements by couplings preventing twisting of the hose upon such coupling.

GEORGE BIJUR,
*Executor of the Estate of Joseph Bijur, Deceased.*